US 7,163,247 B2
(12) United States Patent
Stromberg et al.

(10) Patent No.: US 7,163,247 B2
(45) Date of Patent: Jan. 16, 2007

(54) TOOL HOLDER

(75) Inventors: Karl-Otto Stromberg, Halmstad (SE); Hans Hellman, Huddinge (SE); Dan Holm, Tyreso (SE); Peter Froberg, Solna (SE)

(73) Assignee: C-Power Technologies AB, Tyreso (SE)

( * ) Notice: Subject to any disclaimer, the term of this patent is extended or adjusted under 35 U.S.C. 154(b) by 131 days.

(21) Appl. No.: 10/277,581

(22) Filed: Oct. 21, 2002

(65) Prior Publication Data

US 2003/0173793 A1 Sep. 18, 2003

Related U.S. Application Data

(63) Continuation of application No. 09/733,260, filed on Dec. 8, 2000, now Pat. No. 6,467,826, which is a continuation of application No. PCT/SE99/01106, filed on Jun. 18, 1999.

(30) Foreign Application Priority Data

Jun. 18, 1999 (SE) .................................. 9802192

(51) Int. Cl.
*B66C 1/42* (2006.01)
*B25J 15/08* (2006.01)
(52) U.S. Cl. .................... 294/86.4; 294/902; 901/31
(58) Field of Classification Search ............. 294/86.4, 294/88, 106, 110.1, 902; 901/39, 31, 42, 901/37; 52/645, 652.1; 269/237, 238, 265; 414/729, 739; 228/4.1, 45, 32, 44.3, 212, 228/213; 248/570, 581, 603, 637, 670, 316.6
See application file for complete search history.

(56) References Cited

U.S. PATENT DOCUMENTS

| 392,594 A | 11/1888 | Edmeston |
| 580,771 A | 4/1897 | Caskey |
| 686,352 A | 11/1901 | Sellers |
| 907,853 A | 12/1908 | Murphy |
| 2,875,808 A | 3/1959 | Nelson |
| 2,875,913 A | 3/1959 | Gohrke et al. ................. 294/88 |
| 3,927,424 A | 12/1975 | Itoh ........................... 294/106 |
| 4,200,946 A * | 5/1980 | Lawrence .................... 52/693 |

(Continued)

FOREIGN PATENT DOCUMENTS

DE 3320874 A1 12/1984

(Continued)

*Primary Examiner*—Gene O. Crawford
*Assistant Examiner*—Paul T. Chin
(74) *Attorney, Agent, or Firm*—Oppedahl & Olson LLP

(57) ABSTRACT

Device at tool holder (10) of the kind comprising an essentially C-shaped frame preferably having a long inner range, which frame at its free shank ends carries said tool, for instance a riveting, a glueing or a welding unit. The holder (10) comprises a truss or frame work, which includes an outer and an inner C-shaped frame (11, 23) and a number of slewing brackets (27–32) connected to these. The frames (11, 23) and the slewing brackets (27–32) are arranged to form a number of connected triangular sections, which connection points (18–22, 37) are designed as intersections or joints. The outer C-shaped frame (11) is arranged only to support thrust forces and the inner frame (23) thrust and tensile forces and the slewing brackets (27–32) substantially tensile forces.

16 Claims, 7 Drawing Sheets

U.S. PATENT DOCUMENTS

| | | | |
|---|---|---|---|
| 4,367,891 A | 1/1983 | Wauer et al. ............... 294/104 |
| 4,401,407 A | 8/1983 | Breckenridge ............. 294/106 |
| 4,728,137 A * | 3/1988 | Hamed et al. ................ 294/88 |
| 5,092,731 A | 3/1992 | Jones et al. ................. 294/106 |
| 5,108,140 A | 4/1992 | Bartholet .................... 294/106 |
| 5,378,033 A | 1/1995 | Guo et al. ................... 294/110 |
| 5,379,689 A | 1/1995 | Timmons et al. |
| 5,404,641 A * | 4/1995 | Bratten et al. ............... 29/897.2 |
| 5,473,852 A * | 12/1995 | Lindsey .................... 52/648.1 |
| 5,501,498 A | 3/1996 | Ulrich ........................ 294/106 |
| 5,542,796 A * | 8/1996 | Bratten et al. ............... 408/13 |
| 5,588,688 A * | 12/1996 | Jacobsen et al. ............ 294/106 |
| 5,762,390 A | 6/1998 | Gosslin et al. .............. 294/106 |
| 6,059,169 A * | 5/2000 | Nihei et al. ................... 901/42 |
| 6,260,902 B1 | 7/2001 | Synnelius .................... 294/902 |
| 6,429,397 B1 * | 8/2002 | Sun et al. ................ 219/86.25 |
| 6,512,194 B1 * | 1/2003 | Koshurba et al. ........ 219/86.25 |

FOREIGN PATENT DOCUMENTS

| | | | | |
|---|---|---|---|---|
| EP | 0291 828 A2 | | 5/1988 | |
| EP | 0576739 | * | 1/1994 | |
| JP | 359004981 | * | 1/1984 | .............. 219/86.25 |
| JP | 404046682 | * | 2/1992 | .............. 219/86.25 |
| NL | 8501455 | | 12/1986 | |
| WO | WO 90/06831 | | 6/1990 | |

* cited by examiner

＃ TOOL HOLDER

This application is a continuation of Ser. No. 09/733,260 filed Dec. 8, 2000, now U.S. Pat. No. 6,467,826, which is a continuation of PCT/SE99/01106 filed Jun. 18, 1999 designating the United States, which PCT application was published in English under PCT Article 21(2)(a).

The present invention relates to a device in tool holders and of the kind which comprises a C-shaped frame, has a preferably long inner range, which frame at its free shank ends carries said tool, for example a riveting, a glueing or a welding unit.

THE BACKGROUND OF THE INVENTION AND THE PROBLEM

C-shaped frames of the above mentioned kind are previously known and are used for joining of for instance car body components, frame works, train cars, air crafts, etc. They are made as I-shaped section in high tensile steel since high requirements are put on the stiffness and the structural strength of the frame. Particularly when working operations, such as e.g. riveting, is in question, large opening forces arise on the shanks of the C-shaped frame. The frame is also to be exposed to a large number of working cycles and a minimum of 2 millions cycles is a demand. The C-frame must be able to operate on deeply situated parts in certain situations, i.e, be able to reach a working area which is situated e.g. 1 meter inside an outer limitation. At large scale production in the automotive industry the C-shaped tool holder is being handled by a robot, which means that the weight of the C-frame should be so low that the total weight of the system is less than the allowed operation weight of the robot. At manual operation it is also desired to minimize the mass of the system.

Using the robots of today, one has reached and in some cases also exceeded the weight limit, but the market demands both larger and more stable tool holders with maintained or even lowered weight. The investments in robots are so high that it must be possible to use existing ones even for new and more extensive working operations.

Tests have been made to produce C-shaped frames from composite materials as solid models but the load strains in the intersections in the form, i.a., of shear and tear stresses in the glue joints will become so high, that these tests could not be performed. A typical steel C-frame, having an inner depth of 850 mm, a gap between the ends of the shanks of 400 mm and a calculated load in the form of opposed directed forces of 53 kN, has a weight of about 150 kg at a maximal permitted deflection of 7 mm between the ends of the shanks. This weight together with the weight of the necessary tool equipment exceed the carrying and operating capability of the robot and are therefore not acceptable.

THE OBJECT OF THE INVENTION AND THE SOLUTION OF THE PROBLEM

The object of the invention is to provide a tool holder, which:
a. has a low weight,
b. has a high stiffness,
c. has a high strength,
d. has a simple construction,
e. is price-worthy,
f. can easily be varied in shape and form,
g. can operate in difficult environments, e.g., welding sputters,
h. has a long service life and high reliability.

These tasks have been solved by the features defined in the claims.

DESCRIPTION OF THE DRAWINGS

The invention will be closer described below as an embodiment with reference to the enclosed drawings.

DESCRIPTION OF AN EMBODIMENT

Figure 1:
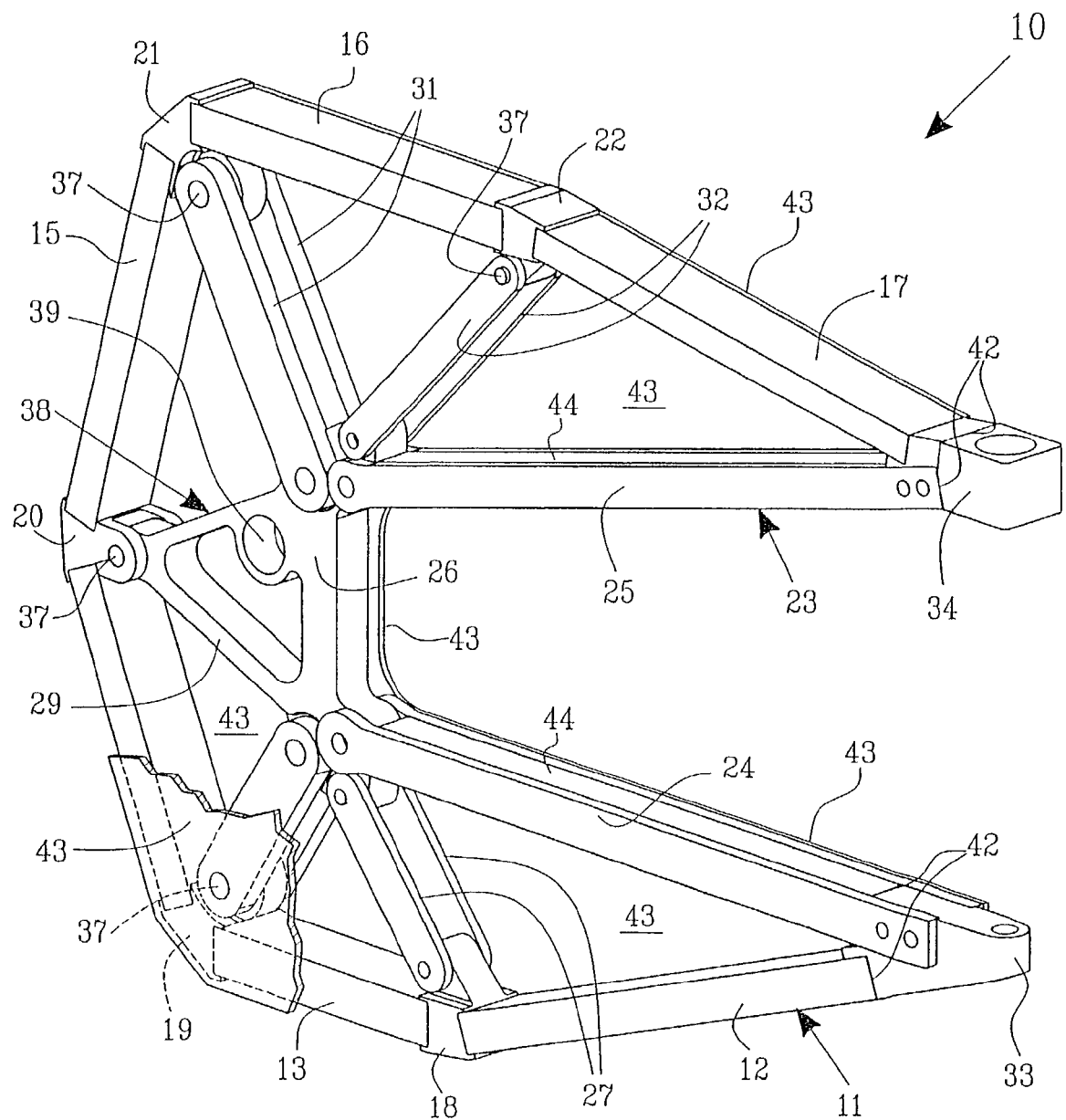
FIG. 1 shows in perspective a tool holder according to the invention with one front covering plate removed.
Figure 2:
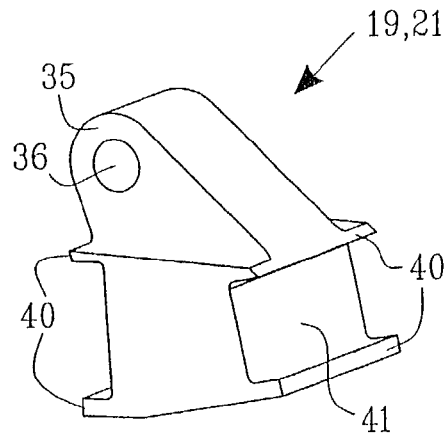
FIGS. 2 and 3 show two of the intersections also in perspective, more exactly the front, upper and lower intersection respectively and the rear, upper and lower intersection respectively.
Figure 3:
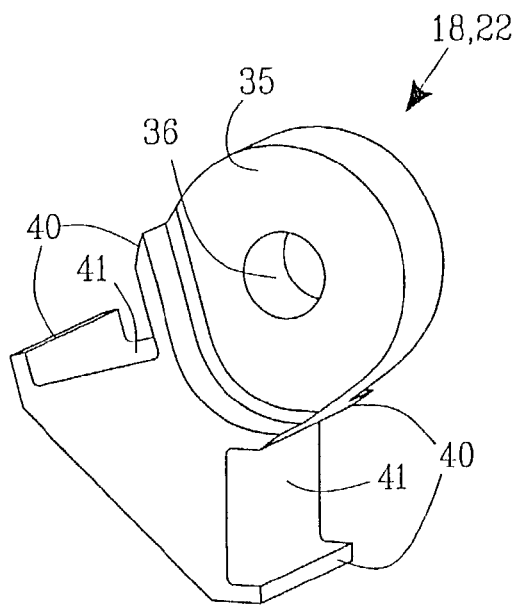
Figure 4:
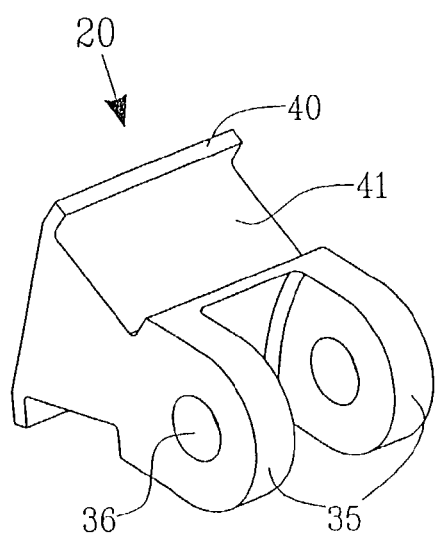
FIG. 4 shows a rear intersection in perspective.
Figure 5:
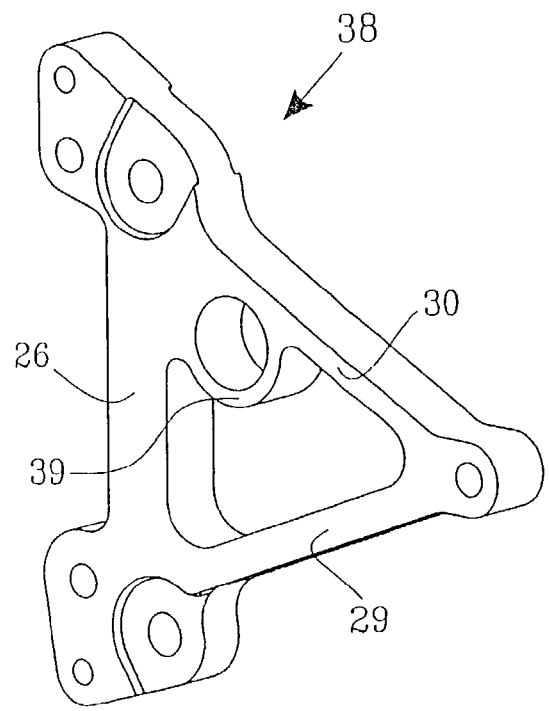
FIG. 5 shows a triangular connecting element in perspective.

The tool holder according to the invention consists of an outer C-shaped frame 11, which in turn includes six frame beams 12–17, of which beams 12, 13 and 17, 16 form the shanks of the C and the beams 14 and 15 the intermediate part between the shanks. Beams 12–17 are interconnected end-to-end via intersections 18–22, so that they together form a C.

Inside the outer C-shaped frame 11, is provided a second C-shaped inner frame 23, comprising the frame beams 24 and 25, which also form the shanks of the inner frame 23, while its intermediate part between the shanks consists of beam part 26.

The outer and the inner C-frame 11,23 are interconnected partly via slewing brackets 27 to 32 and at the end of the shanks via unit attachments 33 and 34. The intersections 18–22 are designed with connecting ears 35 having a through bore 36 for shaft journal, which form articulated joints 37 for the slewing brackets 27–32. In the same way the inner connections between the slewing brackets and the inner frame 23 are designed as joints 37. The beam part 26 and the slewing brackets 29, 30 are designed as a fixed triangular construction part 38, at which is provided a holder attachment 39 e.g. for a robot arm (not shown).

The intersections 18–22 and the unit attachments 33,34 are designed with guide flanges 40 and thrust areas 41 for guidance of and pressure transfer to the end part and end areas 42 respectively of frame beams 12–17. By angularly adjustment the thrust areas 41 of the intersections, the ends of the frame beams can be cut perpendicularly, which simplifies manufacturing.

The torsional rigidity in the C-shaped frame is suitably obtained by the attachment of stiffening plates 43 at both its flat sides, which suitably are connected to the frame beams 12–17 and 24, 25 during load subjected to the frame. The connection can be a glue joint, riveted joint or screw joint or the like. The material can be steel, aluminium, fibre reinforced plastic plates or equal.

In early construction work it proved itself that a frame work construction with intersections free from moments for weight reasons was preferred above a construction having moment absorbing intersections. Solutions comprising moment supporting intersections must be made relatively heavy and unwieldy to be able to handle the heavy loads. The key to achieving a light and durable construction showed to be designing the geometry of the frame work thus that all incoming bars to an intersection meet at one common point. The selected geometry resulted in that the C-frame 11 is put together by a number of interconnected triangles, where at least one side of a triangle is shared with the adjacent triangle.

Since the specific stiffness for composite materials exceeds the one for steel, it is desirable to use as high a ratio of composite material as possible to minimize the weight for the selected stiffness. The chosen construction principle with essentially moment-free intersection results in the outer frame being subjected to only one-axis loads; i.e., compressing strains, whereby composite material is especially suitable. As composite material can be used different kinds of reinforced plastic e.g., carbon fiber reinforced plastic, having a coefficient of elasticity of about 95 in longitudinal direction compared to about 25 for steel, which means that the carbon fiber frame is almost four times lighter than the corresponding steel frame. Since also combined loads arise in the inner parts of the outer frame and steel is a more cost effective construction material, these parts may suitably be of steel or a combination of steel and carbon fiber reinforced plastic, which in the described embodiment has been selected for the frame beams 24 and 25, where the inner part of the frame beam is a carbon fiber beam 44 and the outer parts are steel rods. The weight of the whole tool holder is about half the weight of a steel frame having corresponding performance.

However, this does not exclude, that selected parts of the construction can be replaced of composite material, in case the requirements of lowering the weight and/or stiffness and strength are further increased even more.

In order to optimize the properties of the material the fibres are oriented in the extension of the beams, i.e., longitudinally, which means that the beams can be sawed from carbon reinforced plastic plates and be cut into suitable lengths, whereby the costs for the most expensive parts in the construction can be kept low. The selected construction principle does not require special moulding tools, but permits shell-moulding and modification without large initial costs.

Figure 6:
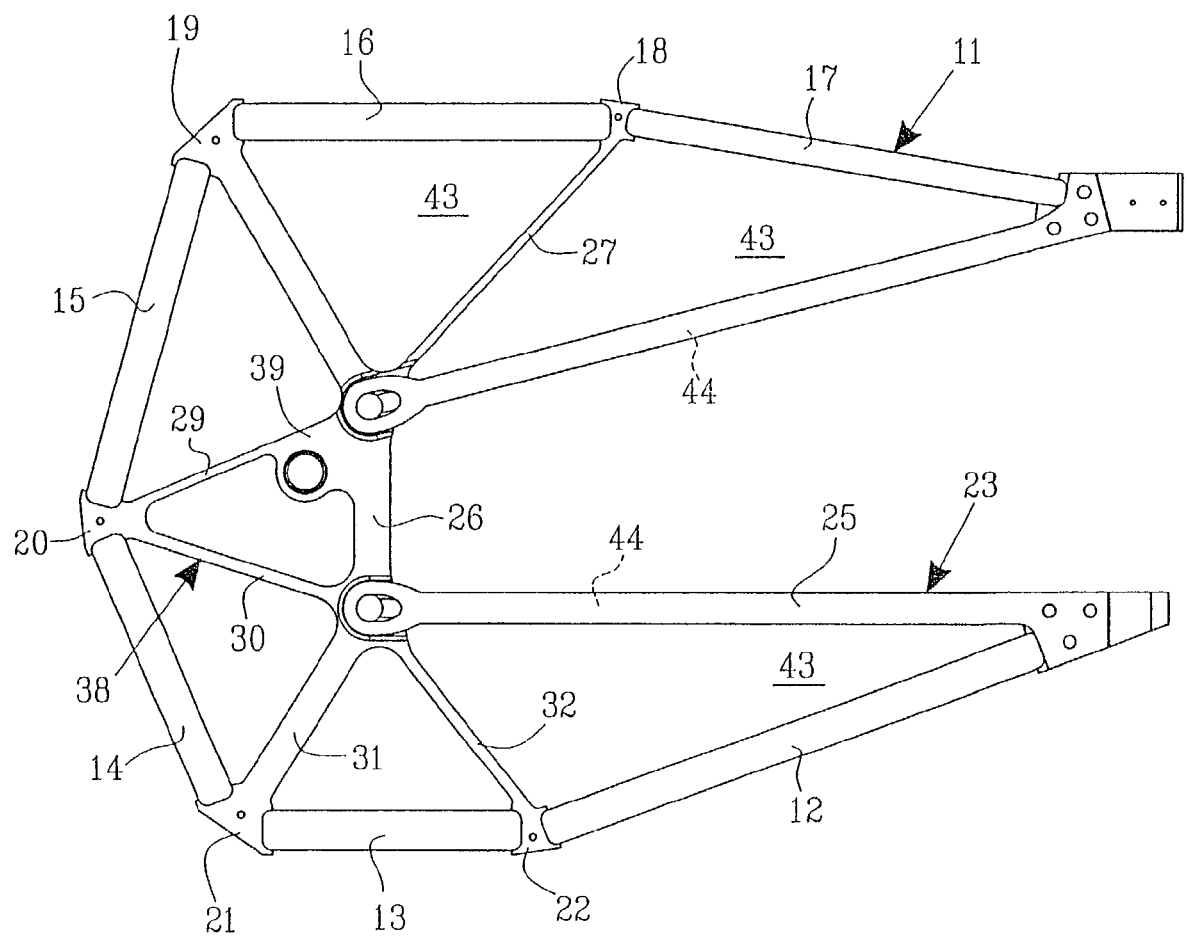
FIG. 6 shows a side view of a modified tool holder according to the invention.
Figure 7:
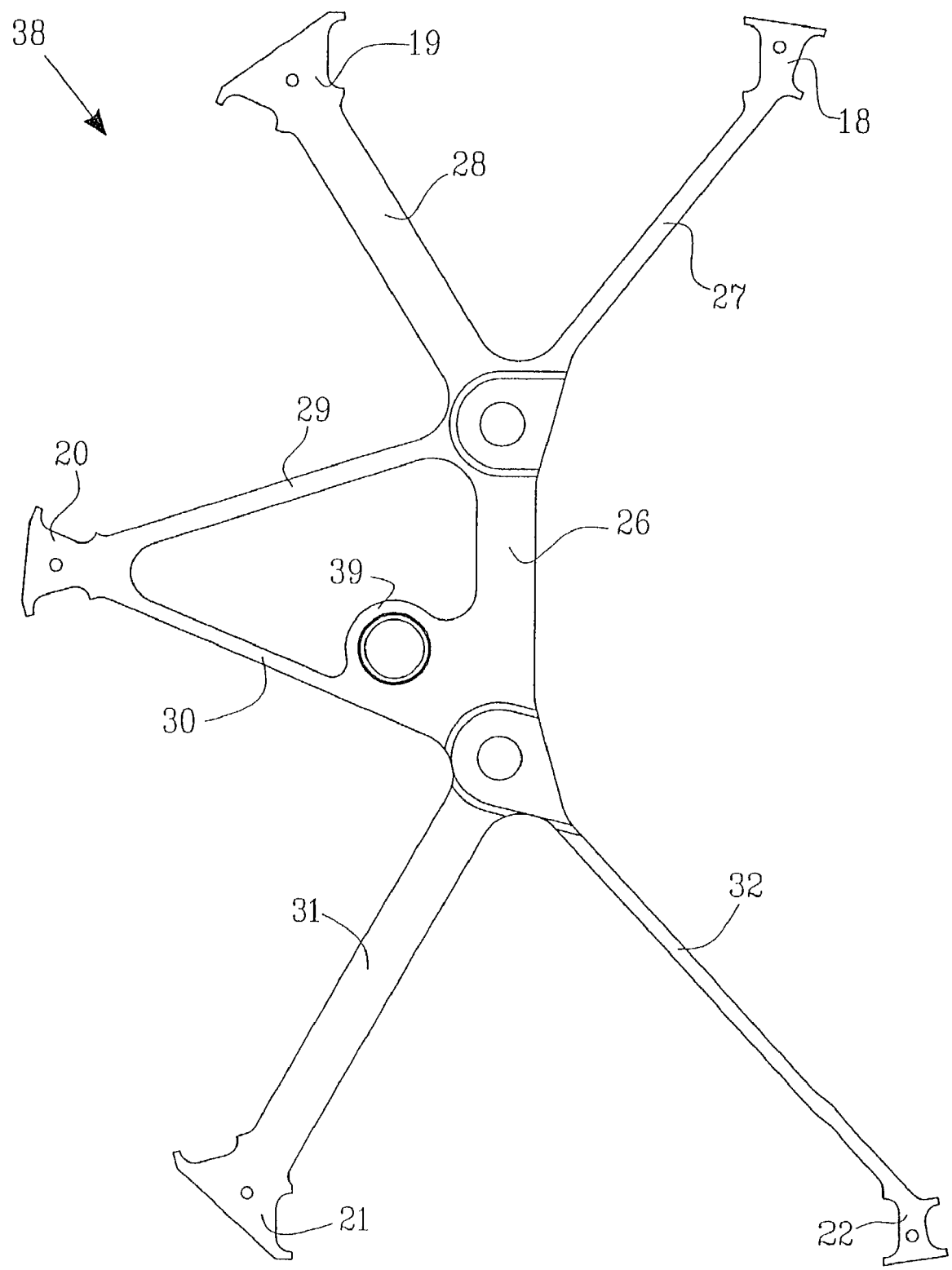
FIG. 7 shows a frame element for the tool holder shown in side view in FIG. 6.

The modified embodiment shown in FIGS. 6 and 7 differs from the above described in that several joints have been replaced by fixed intersections, but with the maintained requirement, that all connection points are moment-free. By this design it is possible to fixedly connect the slewing brackets 27, 28, 31 and 32 to the frame element 38, as to obtain the appearance shown in FIG. 7. The intersections 18–22 are fixedly integrated to the slewing brackets as to reduce the number of associated parts. The frame element 38 is suitably made of metal, for example of steel. The inner frame beam is 24 and 25 are in the same way as before articulately connected to the frame element 38.

Figure 8:
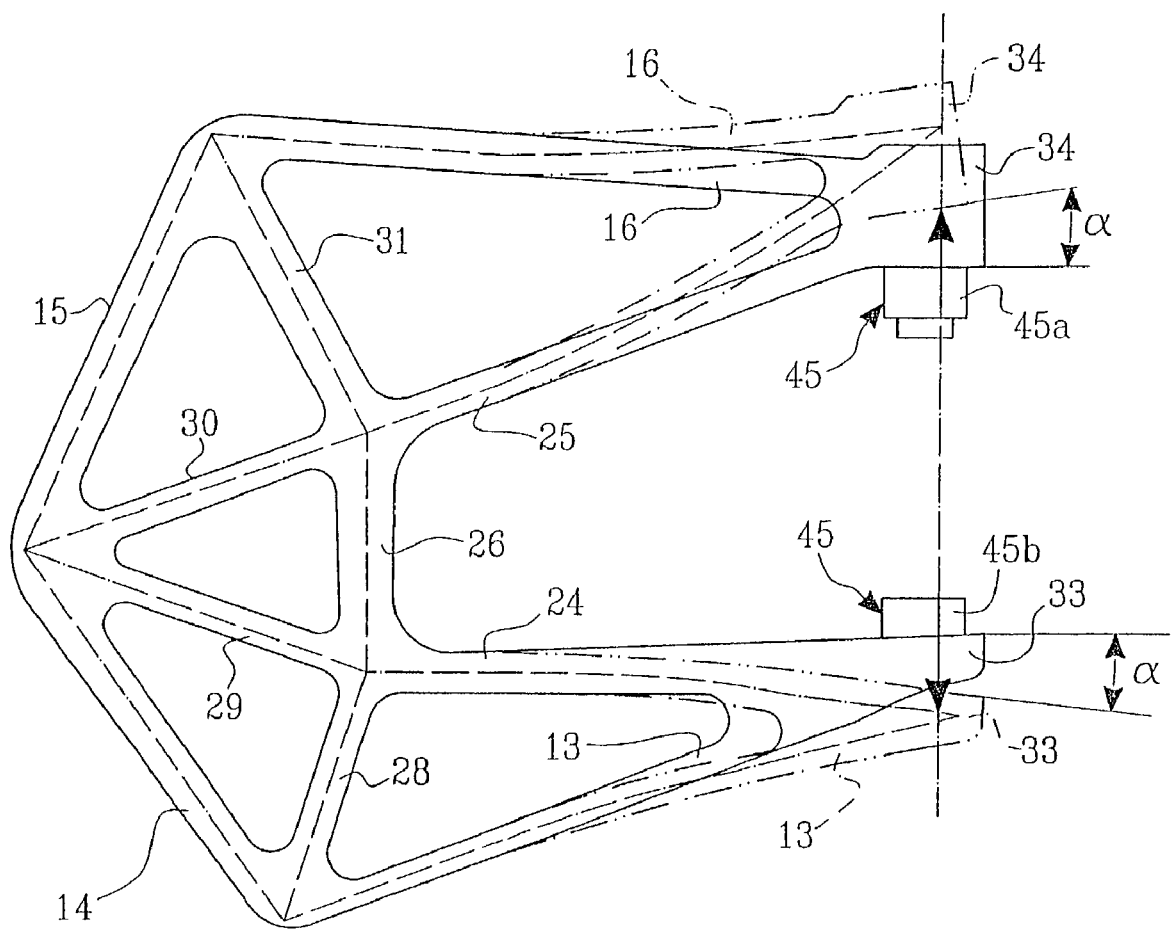
FIG. 8 shows the tool holder according to FIG. 1 in a loaded state.

A disadvantage of designing all intersection points free of moments, is that the tool holder is so deformed during a load, see FIG. 8, that the connection surfaces of the unit attachments 33, 34 not remain parallel but will form an angle α with the horizontal plane.

When high requirements are put on the accuracy in the working process, i.e., that both parts of the tool unit 45, which can be a riveting unit 45a and a riveting knob 45b, are essentially in alignment during the riveting operation, or in other words that the connection surfaces of the unit attachments 33, 34 essentially remain parallel, the principle with the moment free intersections or joints can not be established. To be able to control the deformations of the C-shaped tool holder at load, it is suitable that moment is applied into one or more intersections or bars, which is achieved by that the centre line 46 of the incoming rods to an intersection do not meet in a common intersection point. Therefore all intersections will not be moment free.

Figure 9:
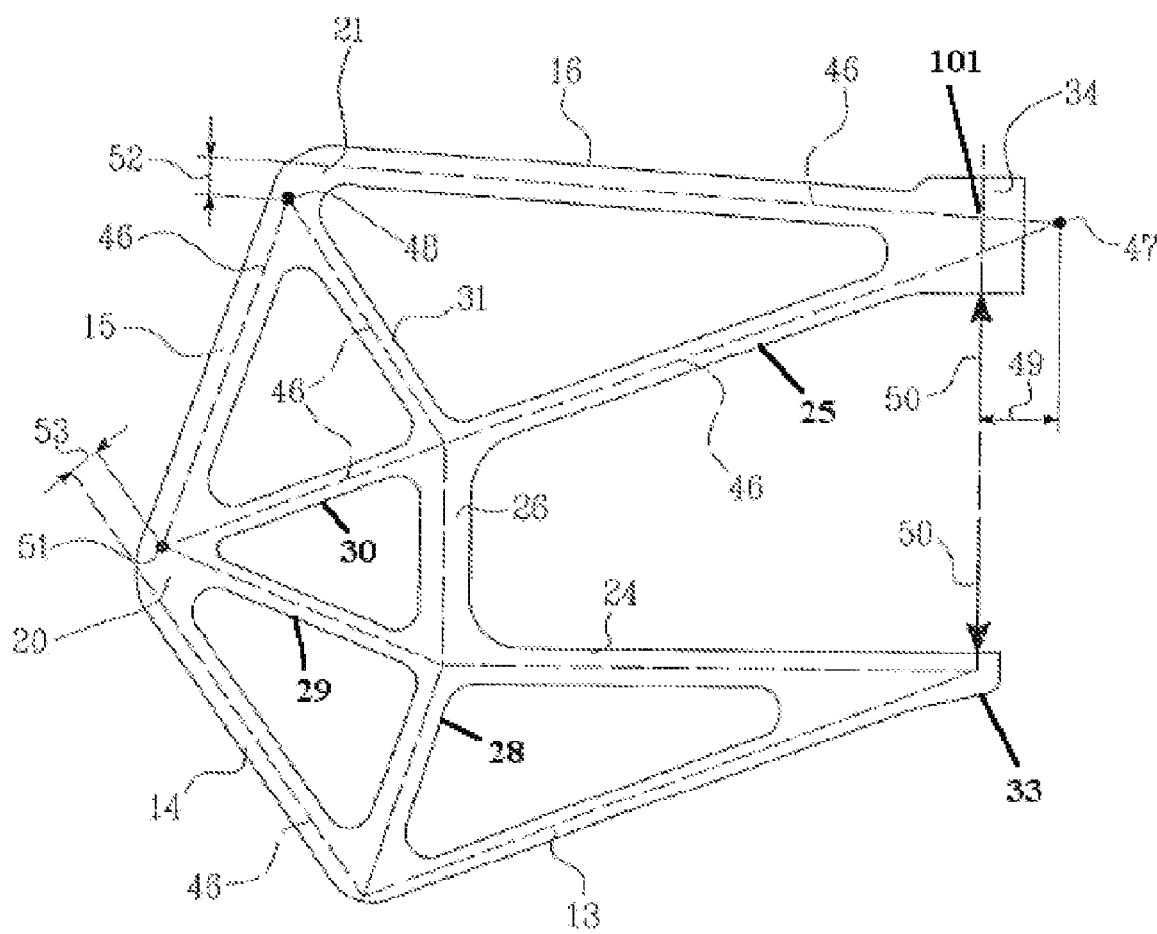
FIG. 9 shows an unloaded tool holder according to a modified embodiment.

In FIG. 9 it is shown how to control the deformation, to achieve certain requirements, e.g., the above mentioned parallelism. In the unit attachment 33 the intersection point 47 of the centre line 46 has been moved outside the attachment 33, as to induce a moment using the moment arm 49 when for instance a riveting load, as shown by arrows 50, attacks the unit attachments 33 and 34.

Figure 10:
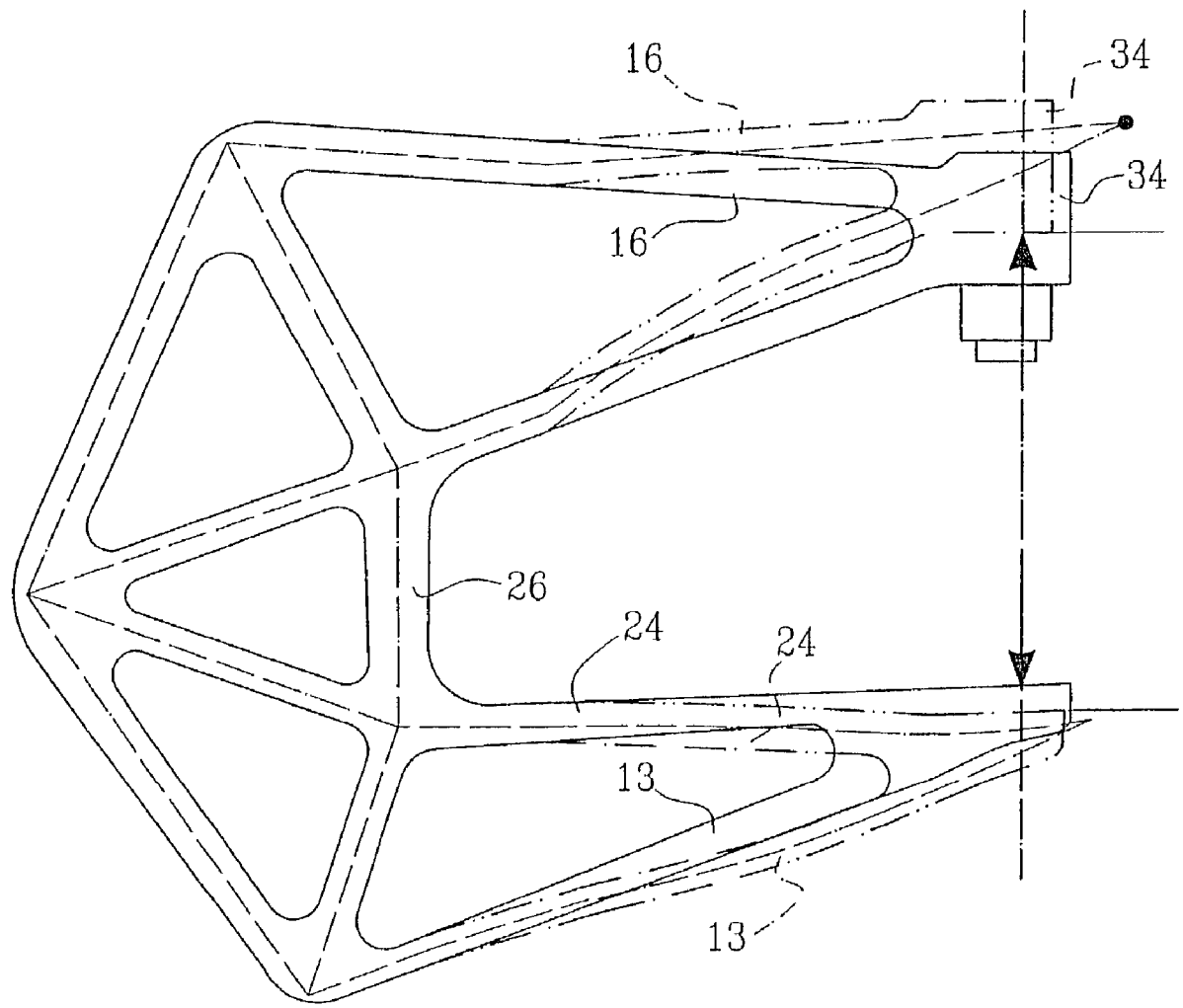
FIG. 10 shows the tool holder according to FIG. 9 in a loaded state.

Further has moment been applied into the intersections 20 and 21, by displacing the attachment points 48, 51 of the frame beams 14, 15, 16 corresponding to the length of the moment arms 52 and 53. Thereby the frame beam 16, 25 and 13, 24 are deformed axially and through bending. FIG. 10 gives an example of this, whereby the parallelism of the connection surfaces of the unit attachments 33, 34 can be maintained.

Intersection point 101 is shown, at which the load line 50 intersects with the center line 46 of said first outer shank portion 16 at an intersection point 101 located closer to a central portion of the tool holder, along the center line 46 of said first outer shank portion 16, than the intersection point 47 at which the center line 46 of the first inner shank portion 25 and the center line 46 of the first outer shank portion 16 intersect.

In this embodiment the stiffening plates 43 are omitted.

The invention is not limited to the embodiment described and shown, but a number of variations are possible within the scope of the claims. Thus, the holder may consist of a larger or smaller number of triangular sections and different constructions of intersection joints are possible.

LIST OF REFERENCE NUMERALS

10 tool holder
11 outer C-frame
12–17 outer frame beams
18–22 intersections
23 inner C-frame
24,25 inner frame beams
26 beam part
27–32 slewing brackets
33,34 unit attachments
35 connecting ears
36 boles
37 joint/shaft journals
38 frame element
39 holder attachments
40 guide flanges
41 thrusts areas
42 end areas
43 stiffening plate
44 carbon fibre beam
45 tool unit
46a riveting unit
45b riveting knob
46 centerline
47 $1^{st}$ intersectional point 48 2nd intersectional point
49 moment arm
50 force arrows
51 3rd intersectional point
52,53 moment arm

The invention claimed is:

1. A substantially C-shaped tool holder comprising:
first and second shank portions, each with a free shank end, and
an intervening construction port ion, said shank portions and said construction portion lying substantially in a common plane,
each free shank end having a respective connection surface facing the other free shank end, the connection surfaces of the free shank ends, in the absence of a load therebetween, being in a first angular orientation relative to each other, said tool holder further comprising:
an inner C-shaped frame, having a first inner shank portion and a second inner shank portion and an inner construction portion therebetween;
an outer C-shaped frame, having a first outer shank portion, a second outer shank portion; a third outer shank portion, and a fourth outer shank portion wherein the third and fourth shank portions are located between the first and second shank portions;
wherein the frames are made from components each frame having a defined center line, the tool holder further comprising:
a plurality of brackets including a first bracket and a second bracket, each bracket having a respective first end and a respective second end, each bracket connecting the inner C-shaped frame to the outer C-shaped frame, thereby defining for each bracket a respective first point of attachment between the first end of the bracket and the inner C-shaped frame and a respective second point of attachment between the second end of each bracket and the outer C-shaped frame,
the first bracket having a defined center line,
wherein the center lines of the first bracket, the first outer shank portion, and the third outer shank portion define a moment arm between:
the center line of the first outer shank portion of the outer C-shaped frame; and
an intersection of the center line of the first bracket and the center line of the third outer shank portion of the outer C-shaped frame;
wherein the first inner shank portion interconnects with the first outer shank portion at the first free shank end, and the second inner shank portion interconnects with the second outer shank portion at the second free shank end, and wherein the center lines of the components of the first inner shank portion and the first outer shank portion, and a load line extending between the free shank ends under load, do not all intersect at a single common intersection point, and
wherein the load line intersects with the center line of said first outer shank portion at an intersection point located closer to a central portion of the tool holder, along the center line of said first outer shank portion, than the intersection point at which the center line of the first inner shank portion and the center line of the first outer shank portion intersect;
whereby in the event of a load urging the free shank ends apart, a moment is introduced by the load, forcing the connection surfaces of the free shank ends apart only essentially along the extension of the load line, thereby preserving the first angular orientation.

2. The tool holder of claim 1 further characterized in that:
the second bracket has a defined center line,
wherein the center lines of the second bracket, the third outer shank portion, and the fourth outer shank portion define a moment arm between:
the center line of the fourth outer shank port ion of the outer C-shaped frame; and
an intersection of the center line of the second bracket and the center line of the third outer shank portion of the outer C-shaped frame.

3. The tool holder of claim 1, wherein the construction portion of the inner C-shaped frame and and two brackets of the plurality of brackets connecting the construction portion of the inner C-shaped frame to the outer C-shaped frame are fabricated as a unitary triangular frame element.

4. The tool holder of claim 3, wherein the unitary triangular frame element has an attachment point for carrying the tool holder.

5. A substantially C-shaped tool holder comprising:
first and second shank portions, each with a free shank end, and
an intervening construction portion, said shank portions and said construction portion lying substantially in a common plane,
each free shank end having a respective connection surface facing the other free shank end, the connection surfaces of the free shank ends, in the absence of a load therebetween, being in a first angular orientation relative to each other, said tool holder further comprising:
an inner C-shaped frame, having a first inner shank portion and a second inner shank portion and an inner construction portion therebetween;
an outer C-shaped frame, having a first outer shank portion, a second outer shank portion; a third outer shank portion, and a fourth outer shank portion wherein the third and fourth shank portions are located between the first and second shank portions;
wherein the frames are made from components each frame having a defined center line, the tool holder further comprising:
a plurality of brackets including a first bracket and a second bracket, each bracket having a respective first end and a respective second end, each bracket connecting the inner C-shaped frame to the outer C-shaped frame, thereby defining for each bracket a respective first point of attachment between the first end of the bracket and the inner C-shaped frame and a respective second point of attachment between the second end of each bracket and the outer C-shaped frame,
the second bracket having a defined center line,
wherein the center lines of the second bracket, the third outer shank portion, and the fourth outer shank portion define a moment arm between:
the center line of the fourth outer shank portion of the outer C-shaped frame; and
an intersection of the center line of the second bracket and the center line of the third outer shank portion of the outer C-shaped frame;
wherein the first inner shank portion interconnects with the first outer shank portion at the first free shank end, and the second inner shank portion interconnects with the second outer shank portion at the second free shank end, and wherein the center lines of the components of the first inner shank portion and the first outer shank portion, and a load line extending between the free shank ends under load, do not all intersect at a single common intersection point, and wherein the load line intersects with the center line of said first outer shank portion at an intersection point located closer to a central portion of the tool holder, along the center line of said first outer shank portion, than the intersection point at which the center line of the first inner shank portion and the center line of the first outer shank portion intersect;

whereby in the event of a load urging the free shank ends apart, a moment is introduced by the load, forcing the connection surfaces of the free shank ends apart only essentially along the extension of the load line, thereby preserving the first angular orientation.

6. The tool holder of claim 5 farther characterized in that: the first bracket has a defined center line,
wherein the center lines of the first bracket, the first outer shank port ion, and the third outer shank portion define a moment arm between:
the center line of the first outer shank portion of the outer C-shaped frame; and
an intersection of the center line of the first bracket and the center line of the third outer shank portion of the outer C-shaped frame.

7. The tool holder of claim 5, wherein the construction portion of the inner C-shaped frame and and two brackets of the plurality of brackets connecting the construction portion of the inner C-shaped frame to the outer C-shaped frame are fabricated as a unitary triangular frame element.

8. The tool holder of claim 7, wherein the unitary triangular frame element has an attachment point for carrying the tool holder.

9. A substantially C-shaped tool holder comprising:
first and second shank portions, each with a free shank end,
a tool mechanically coupled with each of the free shank ends, and
an intervening construction portion, said shank portions and said construction portion lying substantially in a common plane,
each free shank end having a respective connection surface facing the other free shank end, the connection surfaces of the free shank ends, in the absence of a load therebetween, being in a first angular orientation relative to each other, said tool holder further comprising:
an inner C-shaped frame, having a first inner shank portion and a second inner shank portion and an inner construction portion therebetween;
an outer C-shaped frame, having a first outer shank portion, a second outer shank portion; a third outer shank portion, and a fourth outer shank portion wherein the third and fourth shank portions are located between the first and second shank portions;
wherein the frames are made from components each frame having a defined center line, the tool holder further comprising:
a plurality of brackets including a first bracket and a second bracket, each bracket having a respective first end and a respective second end, each bracket connecting the inner C-shaped frame to the outer C-shaped frame, thereby defining for each bracket a respective first point of attachment between the first end of the bracket and the inner C-shaped frame and a respective second point of attachment between the second end of each bracket and the outer C-shaped frame,
the first bracket having a defined center line,
wherein the center lines of the first bracket, the first outer shank portion, and the third outer shank portion define a moment arm between:
the center line of the first outer shank portion of the outer C-shaped frame; and
an intersection of the center line of the first bracket and the center line of the third outer shank portion of the outer C-shaped frame;
wherein the first inner shank portion interconnects with the first outer shank portion at the first free shank end, and the second inner shank portion interconnects with the second outer shank portion at the second free shank end, and wherein the center lines of the components of the first inner shank portion and the first outer shank portion, and a load line extending between the free shank ends under load, do not all intersect at a single common intersection point, and
wherein the load line intersects with the center line of said first outer shank portion at an intersection point located closer to a central portion of the tool holder, along the center line of said first outer shank portion, than the intersection point at which the center line of the first inner shank portion and the center line of the first outer shank portion intersect;
whereby in the event of a load urging the free shank ends apart, a moment is introduced by the load, forcing the connection surfaces of the free shank ends apart only essentially along the extension of the load line, thereby preserving the first angular orientation.

10. The combination of claim 9 further characterized in that:
the second bracket has a defined center line,
wherein the center lines of the second bracket, the third outer shank portion, and the fourth outer shank portion define a moment arm between:
the center line of the fourth outer shank portion of the outer C-shaped frame; and
an intersection of the center line of the second bracket and the center line of the third outer shank portion of the outer C-shaped frame.

11. The tool holder of claim 9, wherein the construction portion of the inner C-shaped frame and and two brackets of the plurality of brackets connecting the construction portion of the inner C-shaped frame to the outer C-shaped frame are fabricated as a unitary triangular frame element.

12. The tool holder of claim 11, wherein the unitary triangular frame element has an attachment point for carrying the tool holder.

13. A substantially C-shaped tool holder comprising:
first and second shank portions, each with a free shank end,
a tool mechanically coupled with the free shank ends, and
an intervening construction portion, said shank portions and said construction portion lying substantially in a common plane,
each free shank end having a respective connection surface facing the other free shank end, the connection surfaces of the free shank ends, in the absence of a load therebetween, being in a first angular orientation relative to each other, said tool holder further comprising:
an inner C-shaped frame, having a first inner shank portion and a second inner shank portion and an inner construction portion therebetween;
an outer C-shaped frame, having a first outer shank portion, a second outer shank portion; a third outer shank portion, and a fourth outer shank portion wherein the third and fourth shank portions are located between the first and second shank portions;

wherein the frames are made from components each frame having a defined center line, the tool holder further comprising:

a plurality of brackets including a first bracket and a second bracket, each bracket having a respective first end and a respective second end, each bracket connecting the inner C-shaped frame to the outer C-shaped frame, thereby defining for each bracket a respective first point of attachment between the first end of the bracket and the inner C-shaped frame and a respective second point of attachment between the second end of each bracket and the outer C-shaped frame, the second bracket having a defined center line, wherein the center lines of the second bracket, the third outer shank portion, and the fourth outer shank portion define a moment arm between:

the center line of the fourth outer shank portion of the outer C-shaped frame; and an intersection of the center line of the second bracket and the center line of the third outer shank portion of the outer C-shaped frame;

wherein the first inner shank port ion interconnects with the first outer shank portion at the first free shank end, and the second inner shank portion interconnects with the second outer shank portion at the second free shank end, and wherein the center lines of the components of the first inner shank portion and the first outer shank portion, and a load line extending between the free shank ends under load, do not all intersect at a single common intersection point, and wherein the load line intersects with the center line of said first outer shank portion at an intersection point located closer to a central portion of the tool holder, along the center line of said first outer shank portion, than the intersection point at which the center line of the first inner shank portion and the center line of the first outer shank portion intersect;

whereby in the event of a load urging the free shank ends apart, a moment is introduced by the load, forcing the connection surfaces of the free shank ends apart only essentially along the extension of the load line, thereby preserving the first angular orientation.

14. The tool holder of claim 13 further characterized in that:

the first bracket has a defined center line, wherein the center lines of the first bracket, the first outer shank portion, and the third outer shank portion define a moment arm between:

the center line of the first outer shank portion of the outer C-shaped frame; and an intersection of the center line of the first bracket and the center line of the third outer shank portion of the outer C-shaped frame.

15. The tool holder of claim 13, wherein the construction portion of the inner C-shaped frame and and two brackets of the plurality of brackets connecting the construction portion of the inner C-shaped frame to the outer C-shaped frame are fabricated as a unitary triangular frame element.

16. The tool holder of claim 15, wherein the unitary triangular frame element has an attachment point for carrying the tool holder.

* * * * *